United States Patent [19]
Mueller et al.

[11] Patent Number: 5,441,284
[45] Date of Patent: Aug. 15, 1995

[54] FLUID OPERATED CHUCK AND METHODS OF OPERATION

[75] Inventors: Gerald E. Mueller, Frankenmuth; Gene B. Slachta, Saginaw, both of Mich.

[73] Assignee: General Manufacturing Systems, Inc., Saginaw, Mich.

[21] Appl. No.: 203,423

[22] Filed: Mar. 1, 1994

[51] Int. Cl.⁶ .................. B23B 31/20; B23B 31/40
[52] U.S. Cl. .................. 279/2.02; 279/2.07; 279/4.03; 279/4.07; 279/132; 279/133
[58] Field of Search .......... 279/2.02, 2.03, 2.07, 279/2.08, 4.03, 4.07, 4.09, 132, 133, 137

[56] References Cited

U.S. PATENT DOCUMENTS

| | | |
|---|---|---|
| 2,460,577 | 2/1949 | Hohwart et al. |
| 2,509,673 | 5/1950 | Church |
| 2,565,430 | 8/1951 | Hohwart et al. |
| 2,873,121 | 2/1959 | Hahn |
| 3,542,354 | 11/1970 | Fitzpatrick |
| 3,770,287 | 11/1973 | Weber et al. |
| 4,139,207 | 2/1979 | Grimes |
| 4,300,780 | 11/1981 | Urbanic ............... 279/132 |
| 4,482,162 | 11/1984 | Anegawa ............. 279/132 |
| 4,953,877 | 9/1990 | Slachta et al. |

*Primary Examiner*—Steven C. Bishop
*Attorney, Agent, or Firm*—Learman & McCulloch

[57] ABSTRACT

Workpiece chucking apparatus includes a chuck body mounting a first plurality of prepositioning lock-up fingers and a second plurality of gripping fingers. The lock-up fingers are biased together radially outwardly or inwardly into engagement with a peripheral wall of a workpiece to initially locate and support the wall of the workpiece in a centered position with respect to a central axis of the chucking apparatus. An inflatable bladder flexes the remaining gripping fingers into gripping engagement with the peripheral wall to further radially support the wall in preparation for machining, without disturbing the prepositioning of the workpiece.

20 Claims, 6 Drawing Sheets

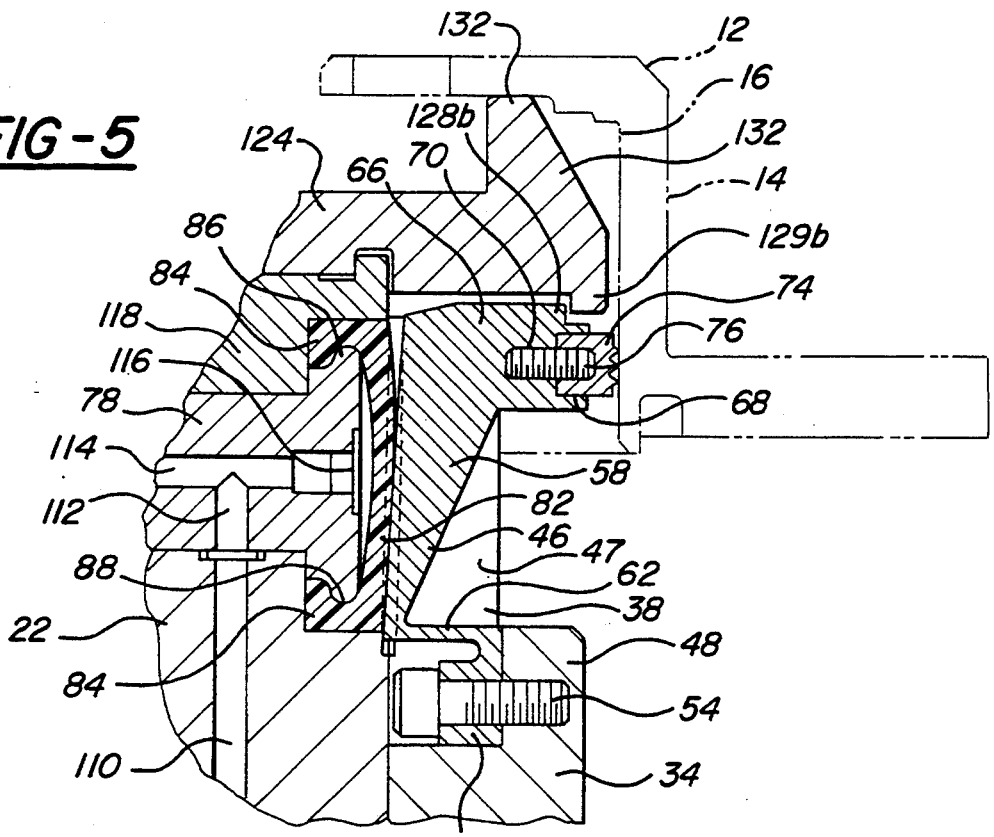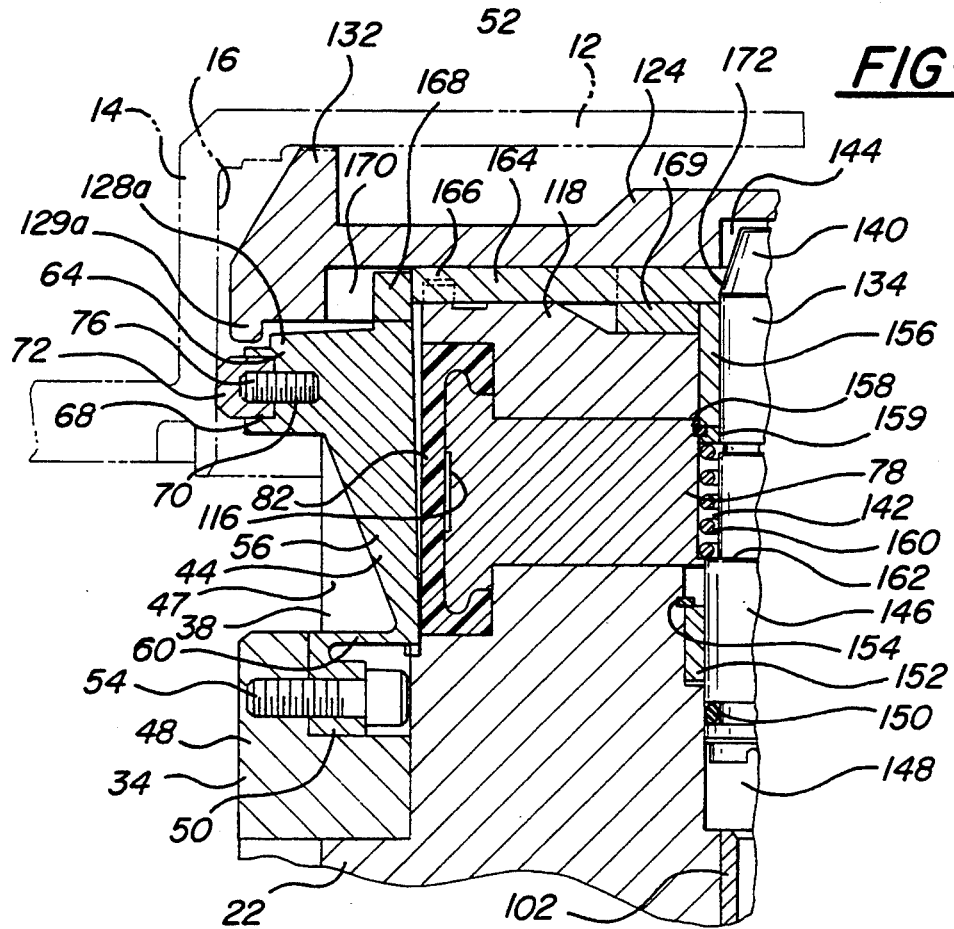

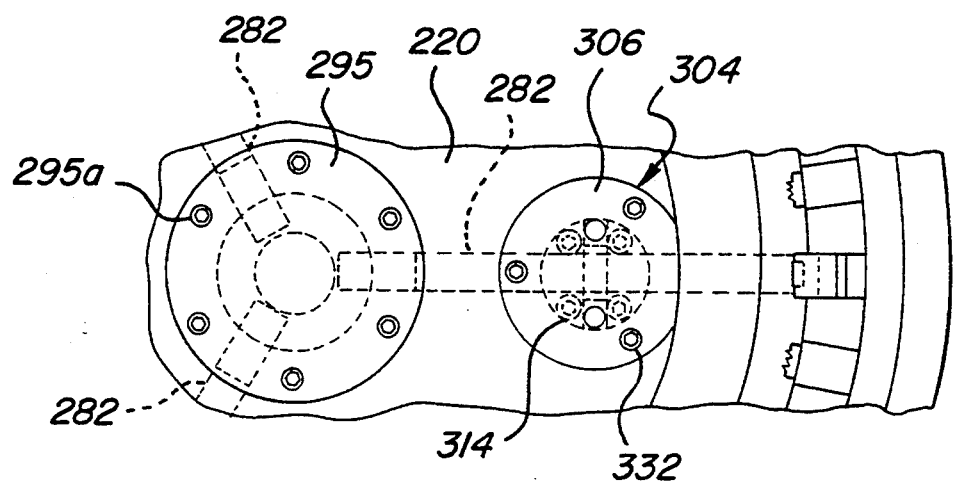
FIG-7
FIG-8
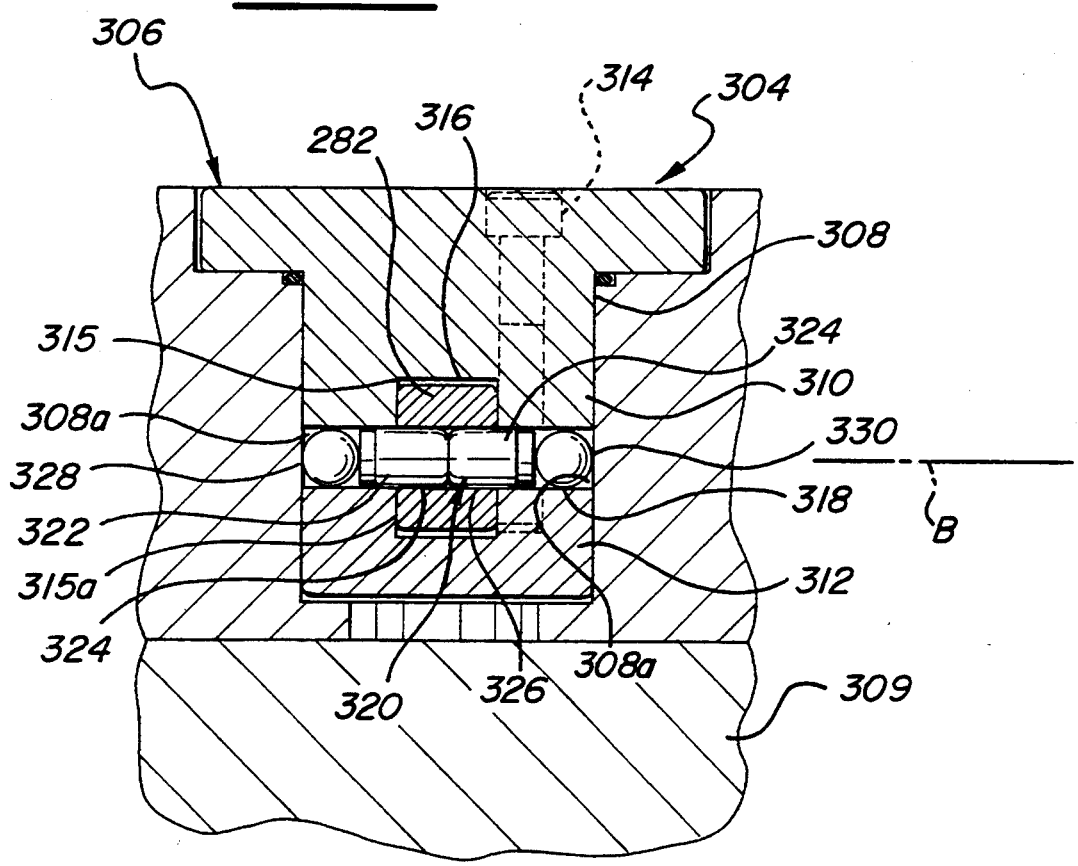

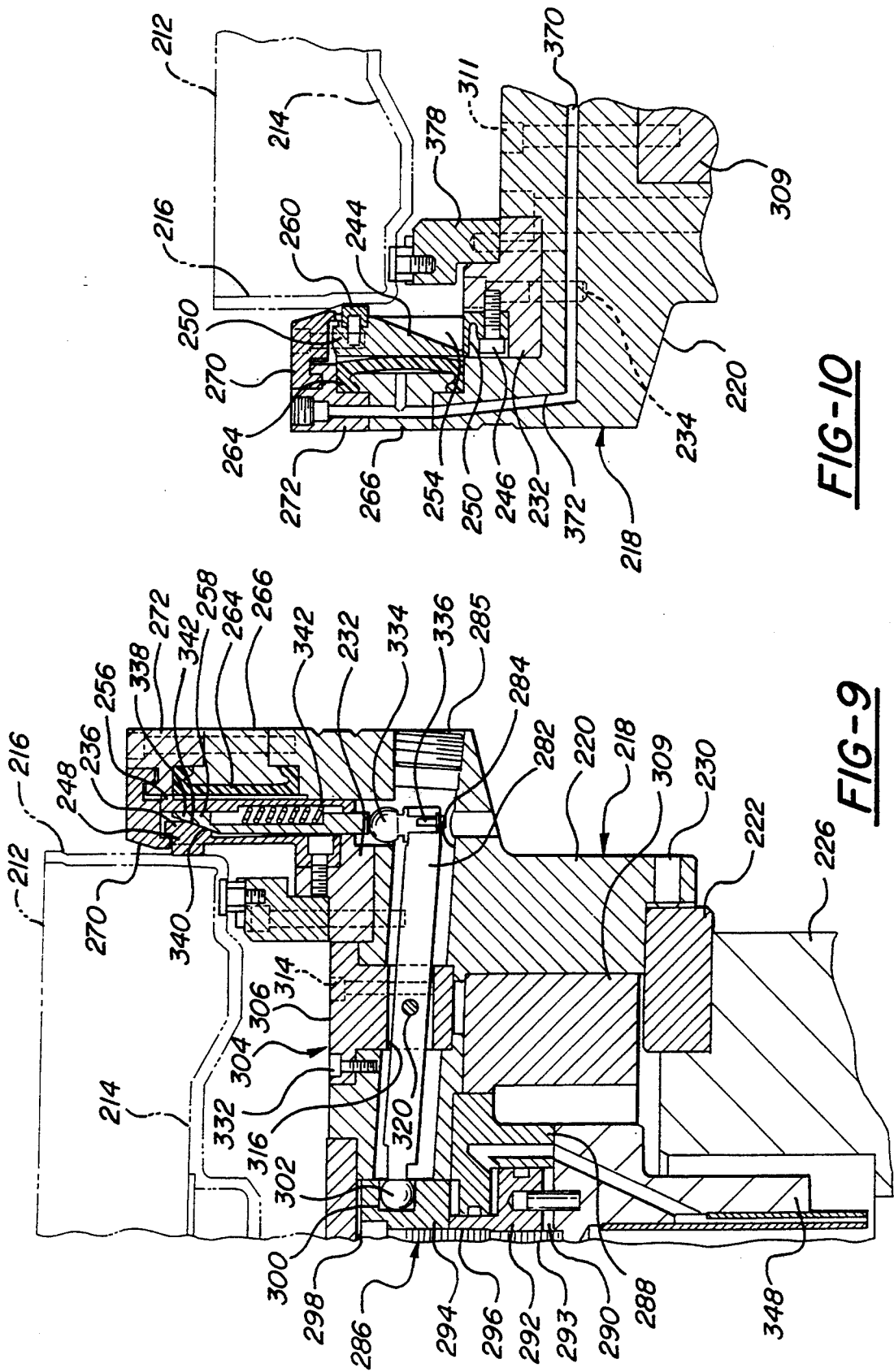

FLUID OPERATED CHUCK AND METHODS OF OPERATION

This invention relates to fluid actuated chucks for clamping and holding thin, easily distortable, hollow workpieces for machining purposes.

BACKGROUND OF THE INVENTION

Hollow workpieces having thin walled cylindrical or tubular wall surfaces to be machined are easily distortable and are best supported for machining by specialized chuck apparatus, such as the type disclosed in the present assigneels U.S. Pat. No. 4,953,877 to Slachta et al, granted Sep. 4, 1990. The Slachta et al chucking device employs a plurality of discrete flexible chucking fingers actuated by a pliable inflatable ring for radially deflecting the fingers into gripping, non-distorting engagement with the peripheral wall of the workpiece. Some workpiece walls are concentric and can be gripped without repositioning them. Other workpieces will be gripped eccentrically without relocating them. In machining many other workpieces, it has been found necessary to first accurately relocate the peripheral wall of the workpiece in a position which is concentric with the axis of the chuck prior to fully gripping it, and a chuck of the general type disclosed in the Slachta et al patent has been improved to achieve the particular result desired.

SUMMARY OF INVENTION AND ADVANTAGES

Chuck apparatus for holding and gripping a peripheral wall of a thin, easily distortable workpiece comprises a chuck body for supporting the workpiece and at least a trio of circumferentially spaced, radially movable lock-up fingers supported concentrically on the chuck body. A plurality of circumferentially spaced, flexible, resilient gripping fingers are also supported concentrically on the chuck body and extend generally axially to respective radially movable free ends thereof.

An actuator mechanism is supported by the chuck body concentrically with respect to the chuck body axis and includes elements which move the lockup fingers radially to lock-up the workpiece and hold the peripheral wall in preparation for gripping by the gripping fingers. The actuator mechanism includes a fluid supply system operatively coupled to an inflatable resilient ring mounted concentrically on the chuck body radially between the chuck body and gripping fingers for selectively inflating the ring with pressurized fluid to expand the ring radially against the gripping fingers and thereby deflect the free ends of the gripping fingers radially into engagement with the peripheral wall of the workpiece, and for deflating the ring to permit the free ends of the gripping fingers to return and release the workpiece.

The conjoint uniform actuation of the lock-up fingers enables them to first of all, lockup the peripheral wall of the workpiece. The gripping fingers may then be actuated to further engage and support the peripheral wall, without distorting the workpiece or disturbing its orientation. The apparatus is suitable for gripping either the inside or outside peripheral surface of a workpiece wall.

Other objects and advantages of the invention will become apparent with reference to the accompanying drawings and the accompanying descriptive matter.

THE DRAWINGS

In the drawings, FIG. 1 is a sectional front elevational view of a chuck constructed in accordance with a first embodiment of the invention, the chucking fingers being shown in a disengaged position;

FIG. 4 is an enlarged, fragmentary front elevational view of a portion of the chuck showing the lock-up fingers deflected into engagement with the workpiece in a first stage of actuation of the chuck;

FIG. 5 is a fragmentary front sectional view of the chuck showing the gripping fingers deflected into gripping engagement with the workpiece in a second stage of actuation of the chuck;

FIG. 7 is a fragmentary top plan view of the chuck of FIG. 6;

FIG. 8 is an enlarged sectional view taken along lines 8—8 of FIG. 6;

Figure 6:
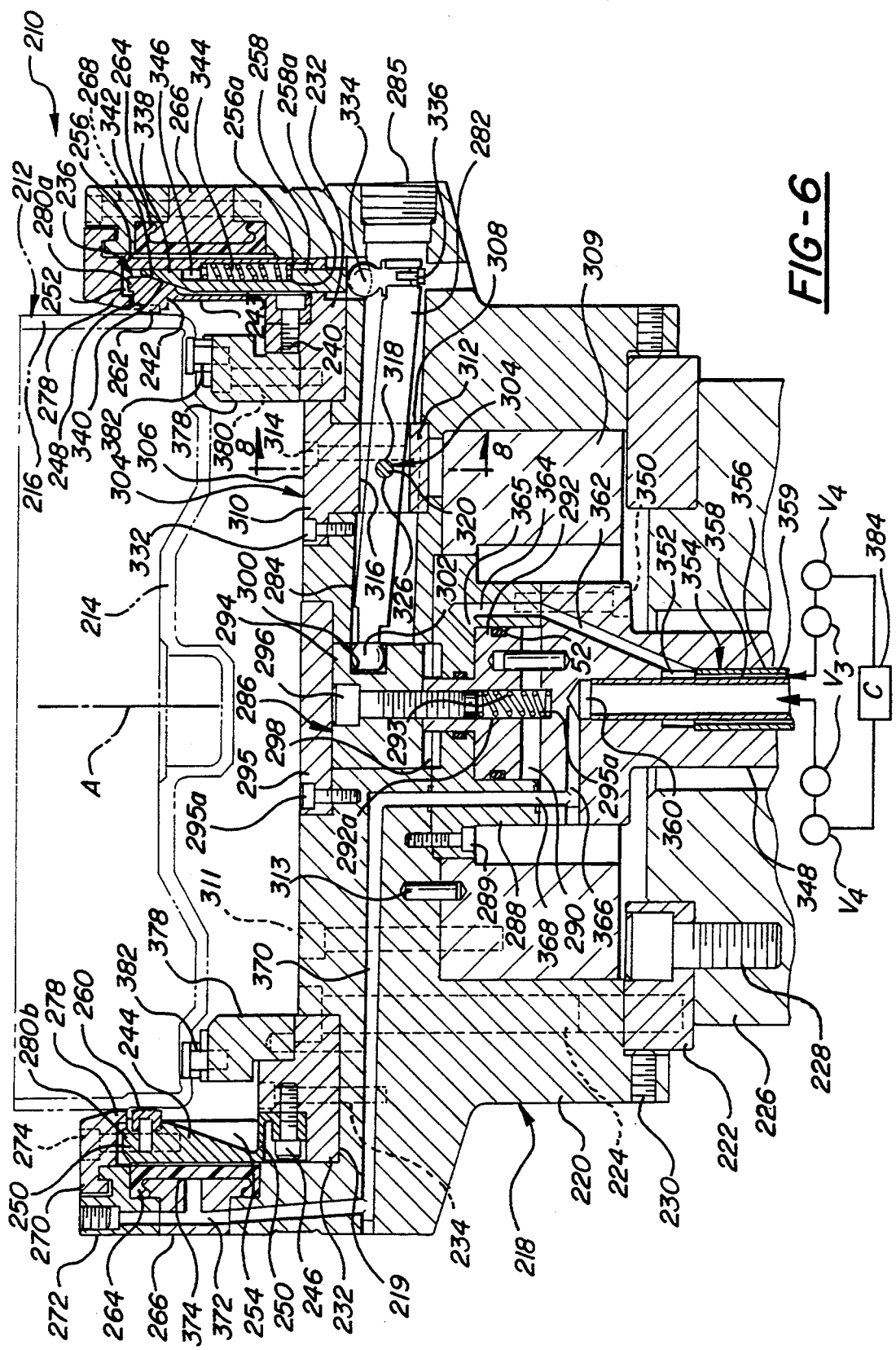
FIG. 6 is a front elevational view of a chuck constructed in accordance with a second embodiment of the invention, the lock-up fingers and gripping fingers being shown in a disengaged position.

FIG. 9 is a fragmentary sectional view of the chuck of FIG. 6, but with the lock-up fingers being shown deflected into engagement with the workpiece in a first stage of actuation of the chuck apparatus; and FIG. 10 is a fragmentary sectional view of the chuck of FIG. 6, but with the engaging fingers being shown deflected into gripping engagement with the workpiece in a second stage of actuation of the chuck apparatus.

DETAILED DESCRIPTION OF THE PREFERRED EMBODIMENTS

A fluid actuated chuck apparatus, constructed according to a first embodiment of the invention, is designated generally by the reference numeral 10, and is illustrated as adapted for use in gripping a workpiece 12 having a thin walled annular wall 14 that is easily distorted, and whose inner surface 16 is to be gripped and held by the chuck 10 during a subsequent machining operation. The chuck 10 is designed to initially center the peripheral wall 14 relative to the axis A of the chuck 10 in a first stage of actuation, and thereafter grip and further support the wall 14 in a second stage of actuation during the subsequent machining operation.

To accomplish the aforementioned objective, the chuck 10 includes a chuck body, generally designated 20, having an annular base portion 22 which may be detachably mounted on an adaptor plate 24 by fasteners 26. The plate 24 may be secured on a suitable rotary machine tool spindle 28 by bolts 30 and aligned concentrically with the spindle axis by set bolts 32.

Figure 2:
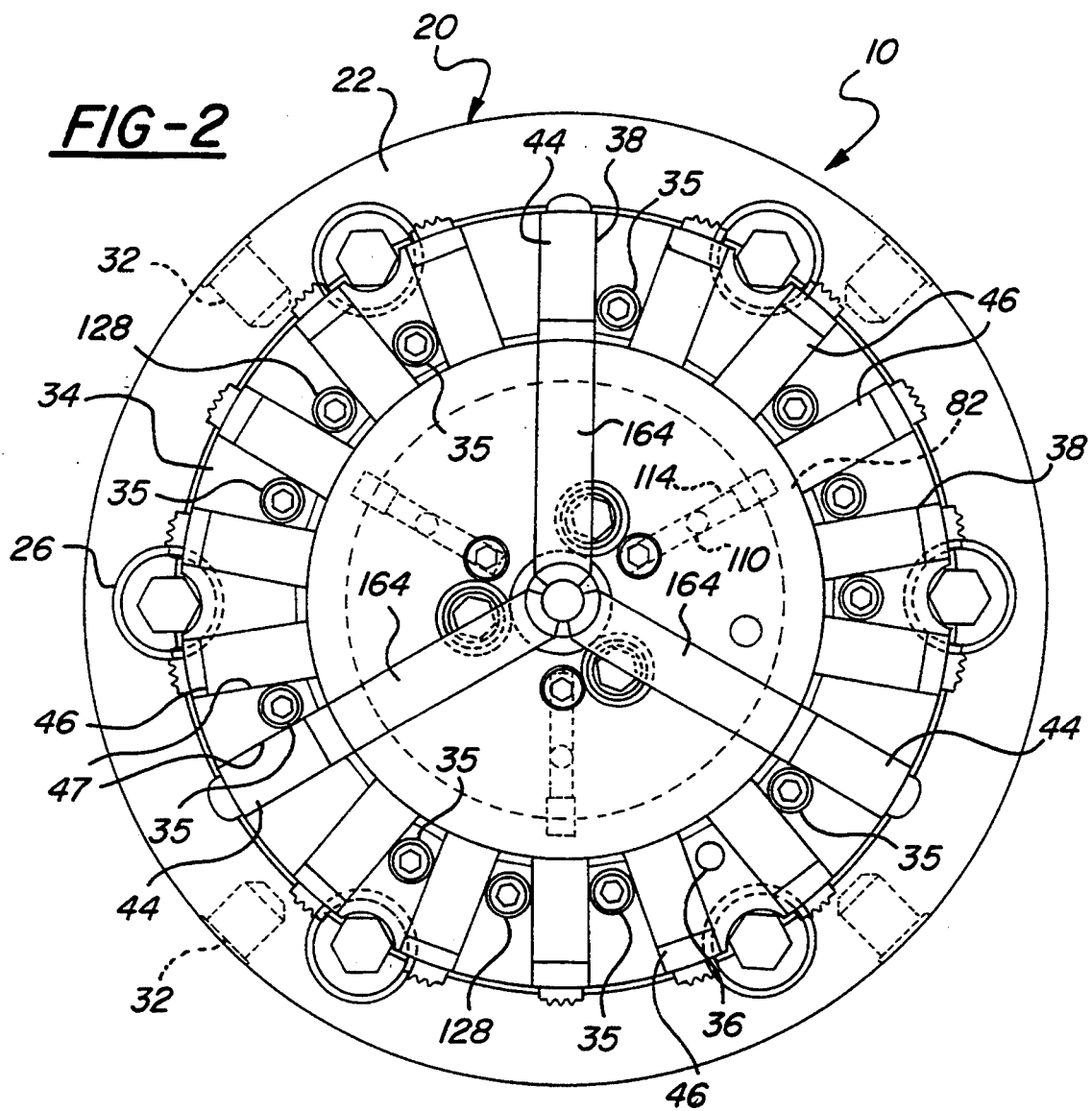
FIG. 2 is a top plan view of the chuck, but with the top end plate and workpiece removed.
Figure 3:
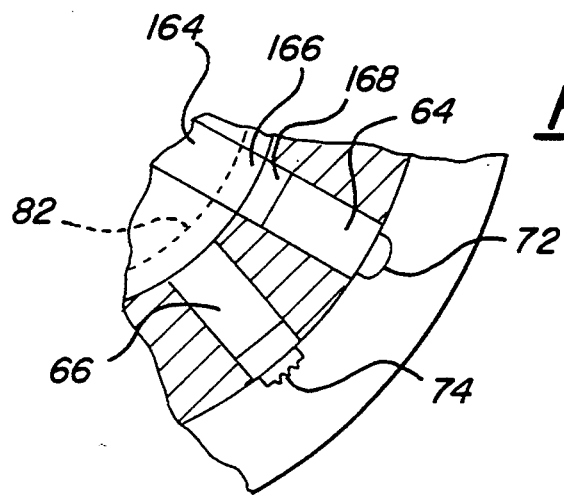
FIG. 3 is an enlarged fragmentary sectional plan view showing a lock-up finger and an adjacent gripping finger.

The chuck body 20 also includes an annular ring-like chucking module 34 which may be located concentrically with the chuck body axis A by piloting on mating surfaces on the parts 22 and 34 and oriented by locating pins 36. Module 34 may be detachably mounted by fasteners 35. The forwardly extending module 34 is vertically recessed to provide a plurality of circumferentially spaced slots or recesses 38 accommodating a trio of circumferentially spaced, axially extending, discrete, flexible, radially deflectable lock-up or locking fingers 44, and a second plurality of separate circumferentially spaced, axially extending, discrete, flexible, radially deflectable gripping fingers 46 of the general type disclosed in U.S. Pat. No. 4,953,877, which patent is incorporated herein by reference. The radially extending recess walls 47 provide lateral support portions that restrain the fingers 44, 46 laterally during radial deflection. As shown best in FIG. 2, the lock-up fingers 44 are equidistantly arranged about the chuck body 20 at 120° intervals. The gripping fingers 46 are uniformly spaced in groups between each adjacent pair of lock-up fingers 44, as also shown in FIG. 2.

The chucking module 34 incorporates a base ring 48 to which the lower ends 50, 52 of each of the lock-up fingers 44 and gripping fingers 46 may be detachably mounted by machine screws 54 which secure the fingers 44, 46 against relative axial movement. The lock-up fingers 44 and gripping fingers 46 have axially extending upper deflectable portions 56, 58, respectively, that are joined to the lower end sections 50, 52, respectively, by intermediate reed sections 60, 62, respectively, and terminate in free front ends 64, 66. The free ends 64, 66 of fingers 44 and 46 respectively are each laterally bored as at 68 to receive work part engaging and gripping elements 72, 74, respectively, which are bolted or otherwise secured to the lock-up fingers 44 and gripping fingers 46, respectively, such as by fastening elements 76. The radial outer surface of the lock-up gripping pads 72 are convex so as to make point contact with the workpiece 12, whereas the radial outer faces of the gripping pads 74 are serrated for gripping or biting the workpiece 12.

The apparatus 10 has a two-stage actuation system for first radially deflecting the free ends of the lock-up fingers 44 uniformly into engagement with the inner surface 16 of the peripheral wall 14 to locate the workpiece 12 on center with the chuck body axis A, and to thereafter deflect the remaining gripping fingers 46 into engagement with the inner chucking surface 16, while it is being held in position by the lock-up fingers 44.

The device for actuating the gripping fingers 46 may include a bladder-retaining ring 78, detachably incorporated with the chuck body 20 by bolts 80. Mounted on the outer circumference of ring 78 is an annular, pliant, resilient expansible bladder ring 82 having a generally C-shaped cross section, with inturned distal ends 84 captured by upper and lower annular flanges 86, 88 provided on the bladder retainer ring 78 (FIG. 5) to perfect an air-tight seal therebetween. The radially outer surface of the bladder ring 82 engages the radially inner surface of the deflectable portions 58 of the gripping fingers 42, 44, when ring 82 is in the deflated condition illustrated in FIG. 1.

Figure 1:
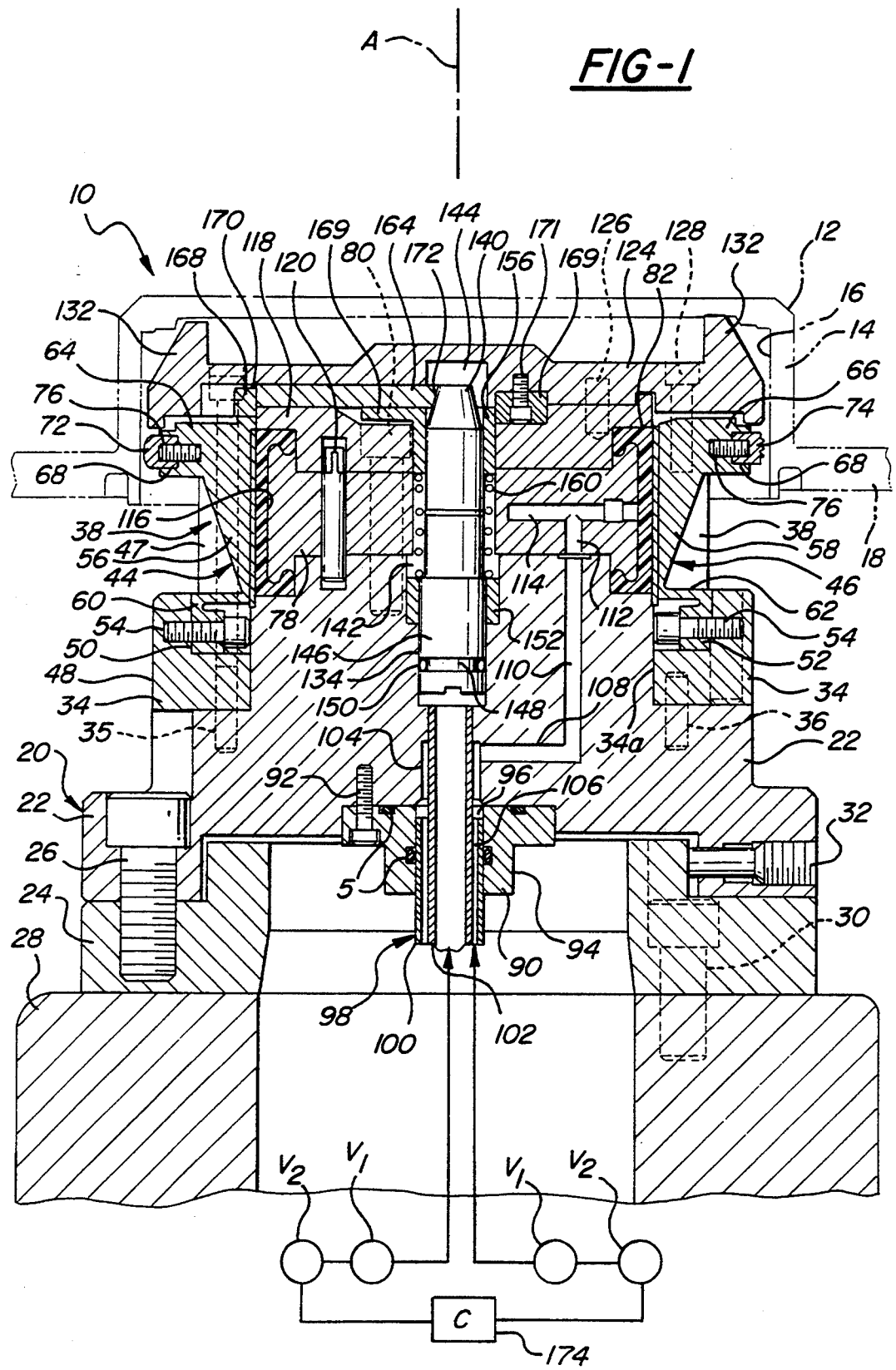

An inlet adaptor fitting 90 is received in a recessed portion 94 of chuck body 20 and may be detachably mounted on chuck body portion 20 by suitable fasteners 92. Adaptor 90 is bored as at 96 to accommodate a dual passage fluid delivery coupling, generally designated 98, provided by an outer conduit 100 and an inner conduit 102 which extends forwardly past conduit 100 up through an upper portion 104 of the bore 96, as illustrated in FIG. 1. The inner conduit 102 is concentrically spaced from the outer conduit 100 to provide an annular fluid delivery passage 106 therebetween. Suitable O-ring seals S are provided for the adapter fitting 90.

A source of pressurized actuating fluid (e.g., air under pressure), such as a compressor 174 with a suitable accumulator, operating via a system which may include an on-off valve $V_1$ and a bleed valve $V_2$ for each conduit 100, 102, may, through suitable passages in the machine tool spindle 28 supply fluid to the conduits 100, 102. Internal fluid passages 108, 110 are provided in the chuck body 20 in fluid communication with fluid passages 112, 114 and an annular distribution groove 116 provided in the bladder retainer 78. There are preferably three sets of such internal passages.

A slide support plate 118 overlies the bladder retainer 78 and is located concentrically by mating surfaces on parts 118 and 78 and radially oriented by pins or dowels 120. It may be detachably mounted on the bladder retainer 78 by the aforementioned bolts 80. Mounted above plate 118 at the front of the chuck is a workpiece support member 124 which is secured to the chucking module 34 by bolts 128 and located concentrically by mating surfaces on parts 124 and 118 and radially oriented by pins or dowels 126. An upstanding annular rib 132 provides a raised workpiece support platform or surface for supporting the workpiece 12 in a position such that the peripheral wall 14 extends downwardly and encircles the chuck body 20, as illustrated in FIG. 1. Provided to limit deflection of the fingers 44, 46 so that excessive travel does not occur, are finger stop or catch projections 128a, 128b (FIGS. 4 and 5) which will engage the dependent flange 129a, 129b (FIGS. 4 and 5) provided on workpiece support member 124.

The mechanism for actuating the lock-up fingers 44 includes a piston 134 accommodated within a central longitudinal cylinder recess, generally designated 142, in chuck body 22 which is open at its lower end to the inner conduit 102 and extends upwardly therefrom. Cylinder recess 142 comprises a bore 142a in chuck body 20, in line with a bore 142b in bladder retainer 78, a bore 142c in member 118, and a blind bore 144 in the underside of workpiece support 124. The piston 134 has an enlarged generally cylindrical base portion 146 received within bore 142b which is grooved on its lower portion as at 148 to accommodate a suitable O-ring 150 to seal cylinder chamber 142. The piston 134 is guided in axial movement by a low friction bushing 152 retained axially by spring clip 154 (FIG. 4). The reduced diameter upper portion of the piston 134 is guided in its vertical movement by another low friction bushing 156, retained against axial movement by a suitable spring clip 158 (FIG. 4), and terminates in the frusto-conical camming surface 140. A return spring 160 encircles the piston 134, between the lower edge of stepped washer 159 held in position by member 158 and an annular shoulder 162 (FIG. 4) provided on the piston 134, and normally forces the piston 134 downwardly to the inoperative position illustrated in FIG. 1.

A plurality of radially extending, horizontally disposed slide bar members 164, corresponding in number and arrangement to the number of lock-up fingers 44, are supported, as best shown in FIG. 4, within radially extending ways or grooves 170 provided in the underside of workpiece support plate 124 and have finger-engaging radially outer ends 166 for engagement with upstanding ears or projections 168 on the lock-up fingers 44. As also seen best in FIG. 4, the radially inner ends of the slide bar members 164 are supported by a support cover 169 with radially extended ways or grooves and detachably mounted by bolts 171. Slide bar members 164 are each provided with a complementally inclined cam follower surface 172 confronting the camming surface 140 on the piston 134. The surfaces 172 and 140 are disposed concentrically with the chuck body axis A such that sliding the piston 134 from the inoperative position shown in FIG. 1 to the operative position shown in FIG. 4 displaces each of the slide bar members 164, and hence lock-up fingers 44, equally radially outwardly, maintaining the contact pads 72 of the lock-up fingers 44 in concentric relationship to the chuck body axis A during their movement toward and into engagement with the workpiece 12.

THE OPERATION

To initiate a chucking operation, a workpiece 12 is supplied to the raised work supporting surface 132, with the lock-up fingers 44 and gripping fingers 46 initially positioned in the inoperative positions illustrated in FIG. 1. Either manually or under the control of a device such as a programmable controller, pressurized actuating fluid (e.g., air) is delivered into the cylinder chamber 148 via the inner conduit 102 and exerts sufficient upward axial pressure on the bottom of the piston 134 to overcome the return spring 160. This forces the piston 134 to slide upwardly and causes the piston camming surface 140 to displace the slide bars 164 radially outwardly. The outward displacement of the slide bars 164, in turn, causes the ends 166 of the slide bars to confront the ears 168 on the lock-up fingers 44, deflecting the free ends 64 radially outwardly toward and into engagement with the chucking surface 16 of the workpiece. The equidistant displacement of the lock-up fingers 44 maintains the free ends 64 of the fingers in concentric relation to the chuck body axis A such that upon engagement with the workpiece 12, the fingers 44 cause the peripheral wall 14 to be centered about the chuck body axis A and held in place by the fingers 44.

Once the workpiece 12 has been secured in place by actuation of the lock-up fingers 44, pressurized actuating fluid may then be introduced either manually or under the control of the controller into the internal passages 108, 110, 112, and 114 via the outer conduit passage 106, and on to passage 116 to thereby inflate and expand the bladder radially outwardly against the inner radial surfaces of the gripping fingers 46. With very thin-walled workpieces it is also advantageous from the standpoint of exerting a uniform pressure circumferentially to have the bladder 82 in pressure exerting contact with lock-up fingers 44. The expansion of the bladder 82 causes the free ends 66 of the gripping fingers 46 to be deflected radially outwardly and slightly axially downwardly along an arcuate path into nondistorting gripping engagement with the chucking surface 16 to thereby provide additional radial support for the peripheral wall 14 during the subsequent machining operation. The camming surfaces 140 and 172 lock the workpiece 12 in centered position, so that the subsequent engagement by the gripping fingers 46 does not disturb the pre-positioning of the workpiece 12.

To release the workpiece 12, the bladder 82 is deflated via operation of the appropriate bleed valve $V_2$, causing the gripping fingers 46 to self-bias radially inwardly out of engagement with the workpiece. The pressure fluid is at the same time bled from cylinder 148, allowing the return spring 160 to return the piston 134 to the inoperative position and permit the lock-up fingers 44 to self-bias radially inwardly to the inoperative position shown in FIG. 1. The machined workpiece 12 may then be removed from the chuck, either manually or as a result of the air pressure actuation of conventional ejector pins or the like.

THE SECOND EMBODIMENT

A fluid actuated chuck apparatus, constructed according to a second embodiment of the invention is illustrated in FIGS. 6–10, and is designated generally by the reference numeral 210. The chuck 210 is adapted for use in centering and gripping a workpiece, generally designated 212, having a central portion 214 and a relatively thin-walled peripheral wall portion 216 whose outer radial surface is to be chucked by the apparatus 210.

The chuck 210 includes a chuck body, generally designated 218, having a dependent peripheral flange portion 220 which may be detachably mounted on a ring-shaped adaptor plate 222 by bolts 224. The plate 222 may be secured to a suitable rotary machine tool spindle 226 by bolts 228 and aligned concentrically with the spindle axis by radial adjustment of the laterally extending positioning bolts 230.

The chuck body 218 incorporates an annular, generally cylindrical chucking module 232 which is received in a recessed portion 219 of body 218 and may be detachably secured concentrically with the chuck body axis A' by bolts 234. The module 232, in a manner to be described, mounts a trio of circumferentially spaced, discrete, flexible lock-up or locking fingers, generally designated 236, preferably fabricated of spring steel, which are secured at one end thereof to chucking module 232 by radially extending bolts 240. The fingers 236 extend upwardly generally axially of the chuck body 218 to free ends 242, and have flexibility-providing resilient leaf or reed sections 243 intermediate their ends. A plurality of circumferentially spaced, discrete flexible gripping fingers, generally designated 244, also preferably fabricated of spring steel, and which are separate and distinct from the lock-up fingers 236, are each also secured at one end thereof to the chucking module 232 by bolts 246. They extend upwardly generally axially of chuck body 218 to free ends 248, and have flexibility-providing resilient leaf or reed sections 250 intermediate their ends.

The chucking module 232 is vertically recessed to provide a plurality of circumferentially spaced finger-accommodating recesses 252, 254, for accommodating and laterally guiding and supporting the fingers 236 and 244, respectively, in the same general manner as the module of the first embodiment of the invention. The recesses 254 for gripping fingers 244 are radially open, whereas the recesses 252 are closed at their radially outer ends by rigid transverse walls 256 and form vertical channels or ways which slideably accommodate cam slides 258, whose construction and function will be described presently in greater detail. The gripping fingers 244 are provided with serrated or knurled gripping pads 260, whereas the lock-up fingers 236 are provided with smooth surfaced workpiece contacting elements 262.

The chuck 210 also incorporates an inflatable pliant bladder ring 264 of the same general construction as that of the first embodiment, but adapted to expand radially inwardly rather than outwardly. The bladder 264 is secured on a bladder-retaining collar or ring 266 of the same configuration as previously, detachably mounted to the base portion 220 by bolts 268, in a position to surround the gripping fingers 236 and 244. A two-piece top plate assembly made up of inner and outer ring portions 270 and 272 overlies the fingers 236, 244 and bladder, and may be secured to the chucking module 232 and base portion 220 by bolts 274 and 268, respectively. The inner ring portion 270 has a downwardly projecting annular flange 278 engageable with the finger stop projections 280a, 280b provided on fingers 236, 244, respectively, to limit inward radial deflection of the fingers so that excessive travel does not occur.

The lock-up fingers 236 and gripping fingers 244 are actuated using the same general type of two-stage actuation system as that utilized for the first embodiment of the invention, but modified for gripping the outer surface of the peripheral wall. The mechanism for actuating the lock-up fingers 236 includes a trio of radially extending circumferentially spaced rocker arms 282 associated with the trio of lock-up fingers 236. Provided within chuck body 218, are radially extending bores 284 which may be closed at their radially outer ends by threaded plugs 285. The rocker arms 282 are each coupled at their radially inner ends to a central piston actuator assembly, generally designated 286, which includes a piston 292. The piston 292 is reciprocable in piston cylinder body 288 which may be detachably mounted to member 220 by bolts 289 and provides an internal chamber 290 in which piston 292 is accommodated for axial sliding movement concentric with the central axis A' of the chuck 210. The piston 292 is provided with suitable seals S₂ and is normally biased to the upper position shown in FIG. 6 by return spring 293 which is accommodated in a passage 292a provided in piston 292 and a spring well 293a provided in an adaptor fitting 348 to be later described. Provided to couple the rocker arms 282 with piston 292, is an actuator 294 which may be detachably secured to the piston 292 by bolts 296 for travel within an axial actuator chamber recess 298 above the cylinder chamber 290. The actuator 294 has a trio of circumferentially spaced sockets 300, each of which accommodates the radially inner ball-shaped free end 302 of one of the rocker arms 282. A cover 295 which may be secured in place by bolts 295a is provided above member 294.

The rocker arms 282 are pivoted between their ends on the chuck body 218 by pivot coupling devices, generally designated 304, such that axial up and down movement of the actuator 294 operates to rock the arms 282 from the unactuated position of FIG. 6 to the actuated position of FIG. 9. Each pivot coupling device 304 comprises a two-piece flanged mount post assembly 306 (FIGS. 7 and 8) accommodated within a cylindrical counterbored vertical recess 308 extending through the base portion 220 in intersecting relation to the radial rocker bores 284 above the spacer ring member 309 which is detachably mounted to the portion 220 by bolts 311 and retained against rotation by dowel pin 313.

Each mounting post assembly 306 has upper and lower portions 310 and 312, respectively, detachably coupled by bolts 314, which are vertically complementally recessed as at 315 and 315a to provide a rocker arm passing opening 316 therebetween that is aligned axially with the radial bore 284 and oversized in height relative to the dimension of the rocker arm 282 to accommodate the rocking movement of the arm 282. The upper surface of the mounting post portion 312 is recessed to provide a transverse groove or bore 318 which can accommodate a split pivot pin assembly 320 which, as illustrated in FIG. 8, comprises a pair of abutting discrete cylindrical pin elements 322 and 324 having inner ends which are accommodated within an aligned transverse bore 326 provided through the rocker arm 282.

The outer ends of pins 322 and 324 extend into and are supported in bore 326. Their length is such that they can be inserted between the lateral walls 308a of recess 308 and into the ends of groove 318 from above, and then moved inwardly into rocker arm bore 326. A pair of ball bearing spacer elements 328 and 330 may be then disposed in groove 318 between the outer ends of the pin elements 322, 324 and the lateral walls 308a of the counterbored recess 308 to retain the pin elements in position within the rocker arm 282.

To pivotally mount a rocker arm 282, the lower portion 312 of the mount post assembly 306 is first positioned within the bottom of a counterbored recess 308, as best illustrated in FIG. 8, and the rocker arm 282 is then inserted through one of the radial bores 284 into one of the sockets 300, as shown in FIG. 6. The pin elements 322, 324 are then inserted into the groove 318 and pushed inwardly into the bore 326. The ball bearing spacers 328, 330 are thereafter placed from above. The upper part 310 of the mounting post assembly is then inserted and secured to the lower part 312. Finally, the pivot coupling 304 is then secured to the base portion 220 by bolts 332.

The radially outer end of each of the rocker arms 282 is provided with an upstanding cam slide-engaging ball element 334 which can be detachably mounted on each rocker arm by fasteners 336. As mentioned earlier, each of the recesses 252 of the chucking module 232 slidably accommodates a cam slide element 258 which is associated with one of the lock-up fingers 236. As shown best in FIG. 6, a radially outer surface of each cam slide 258 confronts the adjacent vertical surface of the transverse chucking module wall 256 and is slideable therealong in the axial direction of the chuck axis A'. The upper free end 338 of each cam slide 258 is wedge-shaped, as illustrated in FIGS. 6 and 9, to provide a radially inner, inclined camming surface 340 that confronts an oppositely inclined radially outer camming surface 342 on one of the lock-up fingers 236. A cam slide return spring 344 which maintains the cam slide 258 in contact with rocker arm ball 334 is accommodated within a spring well 346 provided by adjacent recessed portions 258a and 256a in the cam slides 258 and transverse module wall 256 respectively, and reacts in compression to constantly urge the cam slides 258 downwardly toward the normal inoperative position of FIG. 6.

An inlet adaptor fitting 348 is detachably mounted on the piston cylinder 288 by bolts 350, the upper surface of the adaptor 348 providing the bottom of the piston cylinder chamber 290. The same general type of dual fluid delivery system previously described may be employed to actuate the lock-up fingers and gripping fingers of the second embodiment and, as illustrated in FIG. 6, may include a central bore 352 to accommodate a dual passage, fluid delivery coupling 354. The coupling 354, as previously, includes an outer conduit 356 extending into the central base 352, and an inner conduit 358, within the outer conduit 356, which extends beyond the outer conduit up into a reduced diameter upper bore portion 360, as illustrated in FIG. 6. The inner conduit 358 is concentrically spaced from the outer conduit 356 to provide an annular fluid delivery passage 359. The fluid delivery passage 359 communicates with the piston cylinder chamber 290 via an internal fluid passage 362 provided in the inlet adaptor 348 which, in turn, communicates with fluid passages 364 and 365 in the piston cylinder 288. Passage 365 opens into the upper end of the chamber 290 above the piston 292.

The inner conduit 358 communicates with the inflatable bladder 264 via fluid passages 366 and 368, provided in the inlet adaptor 348 and piston cylinder 288, which are in communication with internal fluid passages 370 and 372 provided in the base portion 220 and bladder retainer 266, respectively. The latter angular passage 372 opens into an annular distribution groove 374 provided in the radially inner surface of the bladder retainer 266 for distributing pressurized fluid to the bladder 264. There may be multiple sets of such internal passages 366, 368, 370, and 372.

One or more sources of pressurized actuating fluid (e.g., air under pressure), such as a compressor 384 with a suitable accumulator, operating via a system which may include an on-off valve $V_3$ and a bleed valve $V_4$ for each conduit 356 and 358, may, through suitable passages in the machine tool spindle 226 supply fluid to the conduits 356 and 358, selectively.

To initiate a chucking operation, a workpiece 212 is supplied to the raised ring-like work support or platform 378 provided at the front end of the chuck. The work support 378 is detachably mounted on the chucking module 232 by bolts 380 located radially inwardly of the fingers 236 and 244. The platform 378 may include a plurality of workpiece-supporting bolts 382 which project above the platform 378 and directly support the workpiece.

THE OPERATION OF THE SECOND EMBODIMENT

Once a workpiece is loaded, either manually, or under the control of a device such as a programmable controller, pressurized actuating fluid (e.g., air under pressure) may be delivered to the fluid delivery passage 359 to pass through internal fluid passages 362 and 364 and into the piston cylinder chamber 290 where it acts on the piston 292 to overcome the biasing force of return springs 290 and 344, thus moving the piston 292 and attached coupling collar 294 downwardly in the chamber to the actuated position shown in FIG. 9. The downward movement of the collar 294 rocks each of the rocker arms 282 conjointly about their pivots 320, causing the radially outer ends of the arms 282 to be lifted. This causes the cam slides 258 to be displaced equidistantly upwardly, bringing the camming surfaces 340 of cam sides 258 into camming engagement with the respective camming or cam follower surfaces 342 of the lock-up fingers 236. As the cam slides 258 continue to move upwardly, the free ends of the lock-up fingers 236 are caused to deflect radially inwardly from the position shown in FIG. 6, to the actuated workpiece-engaging position shown in FIG. 9, wherein the free ends engage the outer chucking surface of the peripheral wall 216 of the workpiece 212.

The conjoint movement of the cam slides 258 maintains the free ends of the lock-up fingers 236 in concentric relationship to the chuck body axis A' during movement toward and into engagement with the workpiece 212. Consequently, the lock-up fingers 236 are able to make appropriate lateral adjustments to the position of the workpiece 212 on the platform 378 to center the peripheral wall of the workpiece 216 about the chuck body axis A'. The wedging of the camming surfaces 340 and 342 serves to lock the lock-up fingers 236 in their actuated positions until such time as the cam slides 258 are moved out of wedging engagement with the lock-up fingers 236 by relieving the fluid pressure from the piston cylinder chamber 290 to permit return springs 344 to operate.

Once the workpiece 212 has been prepositioned and locked in place in centered position by the lock-up fingers 236, pressurized actuating fluid may then be delivered to the inner conduit 358, either manually or under the control of a controller. Via fluid then passing to the internal fluid passages 366, 368, 370, and 372, the bladder 264 is inflated and expands radially inwardly. This causes the free ends 248 of the gripping fingers 244 to be deflected radially inwardly and slightly axially downwardly along an arcuate path into gripping engagement with the peripheral wall 216 of the workpiece to thereby provide additional independent radial support for the subsequent machining operation.

To release the workpiece 212, the bladder 264 may be deflated, causing the gripping fingers 244 to self-bias radially outwardly out of engagement with the workpiece 212, and, with the piston cylinder chamber 290 also relieved of pressurized fluid, the return springs 344 and 376 operate to return the cam slides 258, rocker arms 282, and piston actuating assembly 286 to the inoperative position shown in FIG. 6, thus permitting the lock-up fingers 236 to return and free the workpiece 212.

While the chuck has been shown and described as being rotated on a machine tool spindle, it is to be understood it may also be mounted stationarily on the machine tool.

It is to be understood that the embodiments described are exemplary of various forms of the invention only and that the invention is defined in the appended claims which contemplate various modifications within the spirit and scope of the invention.

I claim:

1. Chuck apparatus for holding and gripping a peripheral wall of a thin, easily distortable workpiece, comprising:

a chuck body having a central longitudinal axis;

a plurality of circumferentially spaced discrete flexible gripping fingers secured at one end to said chuck body and extending axially to opposite respective free ends thereof;

a plurality of circumferentially spaced discrete flexible lock-up fingers secured at one end to said chuck body and extending axially to opposite respective free ends thereof;

an inflatable pliant bladder mounted concentrically on said chuck body radially between said chuck body and said gripping fingers;

a fluid supply system operatively coupled to said bladder for selectively inflating said bladder with pressurized fluid to expand said bladder radially of said chuck body axis against said gripping fingers to thereby deflect said free ends of said gripping fingers radially into gripping engagement with the peripheral wall of the workpiece, and for deflating said bladder to permit said free ends of said gripping fingers to return and release the workpiece;

and a lock-up actuator mechanism supported by said chuck body, having finger engaging portions arranged concentrically with respect to said chuck body axis and moveable radially toward and into engagement with said lock-up fingers while maintaining said concentric relationship of said portions for uniformly deflecting said free ends of said lock-up fingers radially to locate and hold the peripheral wall of the workpiece centered about the chuck body axis for subsequent engagement by said gripping fingers via expansion of said bladder.

2. The apparatus of claim 1 wherein said lock-up actuator mechanism includes a central actuating member slideable along said chuck body axis between operative and inoperative positions, and interconnecting mechanism operatively interconnecting said central actuator and said lockup fingers to transmit the movement of said actuator mechanism to said lock-up fingers in such manner as to move said lock-up fingers into said engagement with the workpiece.

3. The apparatus of claim 2 wherein said interconnecting mechanism comprises a plurality of slide bar members extending radially between inner ends adjacent said actuating member and outer ends adjacent associated lock-up fingers, said outer ends having said finger engaging portions and said inner ends each having a cam follower surface, said actuating member having a cam follower surface confronting said cam surface of each of said slide bar members on movement of said actuating member to said operative position to thereby displace said slide bar members radially toward and into deflecting engagement with said lock-up fingers.

4. The apparatus of claim 3 wherein said actuating member cam surface and said cam follower surfaces of said slide bar members are arranged concentrically about said chuck body axis.

5. The apparatus of claim 3 wherein said lock-up actuator mechanism includes an actuator return device for returning said actuating member to said inoperative position.

6. The apparatus of claim 5 wherein said return device comprises a return spring acting between said actuating member and said chuck body to constantly urge said actuating member toward said inoperative position.

7. The apparatus of claim 6 wherein said chuck body includes a fluid cylinder for operating said actuating member, and fluid delivery supply mechanism for selectively introducing fluid under pressure into said cylinder for forcibly moving said actuating member into said operative position in opposition to said spring, and for relieving the fluid pressure in said chamber to enable the biasing force of said spring to return said actuating member to said inoperative position.

8. The apparatus of claim 3 wherein said slide bars are spaced axially above said bladder.

9. The apparatus of claim 3 wherein there are at least three of said lock-up fingers and said associated slide bars.

10. The apparatus of claim 2 wherein said chuck body includes lateral support portions for restraining said lock-up fingers and said gripping fingers against lateral movement during said radial deflection of said fingers.

11. The apparatus of claim 10 wherein said lateral support portions are provided by a plurality of axially extending recess walls circumferentially spaced about said chuck body for accommodating said lock-up fingers and said gripping fingers.

12. The apparatus of claim 2 wherein said free ends of said lock-up fingers and said gripping fingers are deflectable radially inwardly toward said chuck body axis for engaging an external surface of the peripheral wall.

13. The apparatus of claim 12 wherein said interconnecting mechanism comprises a plurality of radially extending rocker arms pivoted to said chuck body between opposite inner and outer ends and engaging said actuating member at said inner ends thereof for imparting conjoint rocking movement to said rocker arms in response to moving said actuating member between said inoperative and operative positions.

14. The apparatus of claim 13 wherein said interconnecting mechanism comprises a plurality of cam slides supported by said chuck body radially between said chuck body and said lock-up fingers for axial movement between actuated and unactuated positions, each cam slide having a camming portion and each lock-up finger having an associated cam follower portion confronted by said cam slide camming portion when in said actuated position to thereby deflect said lock-up fingers into said engagement with the workpiece.

15. The apparatus of claim 14 wherein said lock-up actuator mechanism includes a cam slide return device for returning said cam slides to said unactuated position out of camming engagement with said lock-up fingers.

16. The apparatus of claim 15 wherein said cam slide return device comprises return springs acting between said cam slides and said chuck body to constantly bias said cam slides toward said unactuated position.

17. The apparatus of claim 16 wherein said chuck body includes a fluid cylinder accommodating said actuating member and fluid delivery supply mechanism for selectively introducing fluid under pressure into said cylinder for forcibly moving said actuating member into said operative position, and for relieving the fluid pressure in said chamber to enable the biasing force of said springs to return said actuating member to said inoperative position.

18. In a method of operating a chuck apparatus comprising: a chuck body having a central longitudinal axis and adapted to be mounted on a machine tool; a plurality of circumferentially spaced discrete flexible gripping fingers secured at one end to said chuck body and extending axially to opposite respective free ends thereof; an inflatable pliant bladder mounted concentrically on said chuck body radially between said chuck body and said gripping fingers; a plurality of circumferentially spaced discrete lock-up fingers secured at one end to said chuck body and extending axially to opposite free ends thereof; a fluid supply system operatively coupled to said bladder for selectively inflating said bladder with pressurized fluid to expand said bladder radially of said chuck body axis against said gripping fingers to thereby deflect said free ends of said gripping fingers radially into gripping engagement with the peripheral wall of the workpiece, and for deflating said bladder to permit said free ends of said gripping fingers to return and release the workpiece; and a lock-up actuator mechanism supported by said chuck body having finger engaging portions arranged concentrically with respect to said chuck body axis and moveable radially toward and into engagement with said lockup fingers, while maintaining said concentric relationship of said portions, for uniformly deflecting said free ends of said lock-up fingers radially of said chuck body axis toward and into engagement with the peripheral wall of the workpiece before actuating said gripping fingers to locate and hold the peripheral wall of the workpiece centered about the chuck body axis for subsequent engagement by said gripping fingers, said method comprising the steps of:

loading a workpiece having a radial wall to be gripped to the chuck body;

operating the lock-up actuator mechanism to first move said lock-up fingers radially to position and secure the radial wall of the workpiece centered about the chuck body axis;

and thereafter operating said fluid supply system to inflate said bladder to cause said plurality of gripping fingers to grip the radial wall of the workpiece.

19. In a chuck for gripping workpieces to be machined, the combination of:
  (a) a chuck body, having a base end and a front end, adapted to be mounted on a machine tool;
  (b) a workpiece support surface for supporting a workpiece to be machined provided for said chuck body at the front end thereof;
  (c) generally radially movable locking fingers supported in concentric relationship with said chuck body;
  (d) generally axially extending, generally radially deflectable resilient gripping fingers provided on said chuck body in concentric relationship therewith;
  (e) an inflatable bladder mounted on said chuck body in generally concentric relationship with said chuck body circumferentially adjacent said gripping fingers; and
  (f) control mechanism for radially moving said locking fingers to cause them to engage said workpiece and then supplying a fluid under pressure to inflate said bladder and move said gripping fingers generally radially into gripping engagement with the workpiece.

20. In a method of operating a workpiece gripping chuck incorporating: a chuck body with a front end and a rear base end adapted to mount on a machine tool; a workpiece support surface for the front end of the chuck body for supporting a workpiece to be machined; a plurality of locking fingers supported concentrically with said chuck body; a plurality of generally radially movable, generally axially extending flexible gripping fingers supported concentrically with said chuck body; an inflatable bladder on said chuck body in generally concentric relationship therewith circumferentially adjacent to said plurality of gripping fingers; and two-stage control mechanism for initially moving said locking fingers radially toward and into releasable engagement with the workpiece; and for sequentially then deflecting the gripping fingers radially of the chuck body toward and into releasable engagement with the radial wall of the workpiece, the steps of:
  (a) loading a workpiece having a radial wall to be gripped to said workpiece support surface; and
  (b) operating said control mechanism to first move said locking fingers radially to engage the radial wall of the workpiece and then to inflate said bladder to cause said plurality of gripping fingers to grip the radial wall of the workpiece.

* * * * *